United States Patent [19]

Chang

[11] 3,994,851

[45] Nov. 30, 1976

[54] HIGH SOLIDS POLYESTER COATING COMPOSITION

[75] Inventor: Wen-Hsuan Chang, Gibsonia, Pa.

[73] Assignee: PPG Industries, Inc., Pittsburgh, Pa.

[22] Filed: Oct. 26, 1972

[21] Appl. No.: 301,034

[52] U.S. Cl. .......................... 260/29.4 R; 260/39 P; 260/850
[51] Int. Cl.² .......................................... C08L 61/20
[58] Field of Search .............. 260/850, 39 P, 29.4 R

[56] References Cited
UNITED STATES PATENTS

| | | | |
|---|---|---|---|
| 3,425,974 | 2/1969 | Semrac | 260/850 X |
| 3,449,467 | 6/1969 | Wynstra | 260/850 |
| 3,544,656 | 12/1970 | Hornung et al. | 260/850 |

*Primary Examiner*—Donald E. Czaja
*Assistant Examiner*—S. M. Person
*Attorney, Agent, or Firm*—George D. Morris

[57] ABSTRACT

High solids coating compositions can be formulated from an ester-containing polyol having a molecular weight of less than about 850 and a viscosity of less than about 60 poises, and an amine-aldehyde crosslinking agent. Such compositions aid in environmental control problems as well as having good adhesion, flexibility, hardness, stain resistance, detergent resistance, solvent resistance and the like.

34 Claims, No Drawings

HIGH SOLIDS POLYESTER COATING COMPOSITION

BACKGROUND OF THE INVENTION

In recent years the coatings industry has become increasingly interested in high solids coatings. That is, coatings which can be applied by conventional techniques such as spraying, dipping, roll coating, etc., without the use of much volatile solvents or dispersants. The use of high solids coatings presents several advantages, including high film build per application, economy of materials since normally the solvents are lost to the ambient surroundings, and the diminuation of environmental control problems such as treatment of plant effluents to capture or destroy volatile pollutants.

However, to be a viable coating material, the high solids coating after application must produce under conventional curing conditions a film having, depending on the case, at least several of those characteristics required of coatings such as adhesion, flexibility, hardness, stain resistance, detergent resistance, solvent resistance, humidity resistance, and the like.

It should be noted that most high solids coatings are not true 100 percent solids coatings since in most cases minor amounts of organic volatiles are emitted on curing.

Although the prior art does disclose the use of polyester resins having reasonably high solids content, such compositions do not have the advantages of the low molecular weight, low viscosity composition and water compatibility as the compositions employed herein. The compositions herein, because of their low viscosity and low molecular weight, are easy to blend, mix and apply.

French Pat. No. 2,023,326 is directed to linear polyester coating agents having a molecular weight up to 3000 and U.S. Pat. No. 3,553,284 is directed to compositions comprising an aminoplast and a polyester of hexahydroterephthalic acid and a diol having adjacent hydroxy groups, e.g., ethylene glycol butanediol-(2,3) or cyclohexanediol-(1,2), such compositions are specific to hexahydroterephthalic acid and provide for compositions which have a substantial high viscosity and low water compatibility. German Pat. No. 2,019,282 teaches an aliphatic polyol, a mixture of aliphatic diols (and if necessary, cycloaliphatic diols) such as ethylene glycol and propane diol and one or more aromatic or cycloaliphatic dicarboxylic acids and one or more saturated aliphatic dicarboxylic acids along with an aminoplast resin. In contrast with the invention herein, this German patent teaches the use of a mixture of specific aliphatic polyol and the necessity for the employment of an aromatic or cycloaliphatic dicarboxylic acid.

Thus, it is surprising that the compositions herein will provide for useful coating when the art is devoid of any teachings which would lead one to believe that useful high solid coating compositions could readily be formulated from a simple ester-containing polyol and an amine-aldehyde crosslinking agent. In the past, ester-containing polyols were generally employed as starting materials for making resins.

DESCRIPTION OF THE INVENTION

Now it has been discovered that a high solids or low solvent coating composition can be formulated from an ester-containing polyol and an amine-aldehyde crosslinking agent. More particularly, the invention herein provides for high solids coating compositions having a solids content of at least 70 percent by weight, based on weight of total coating composition, comprising (a) from about 30 to about 85 percent by weight based on (a) and (b) of an ester-containing polyol having a molecular weight of less than 850 and a viscosity of less than about 60 poises, and (b) from about 15 to about 70 percent by weight based on (a) and (b) of an amine-aldehyde crosslinking agent.

The present invention contemplates the use of coatings having up to 100 percent solids content. Even at such high solids levels, the coatings herein have sufficient low viscosity so as to enable easy application by spraying, dipping, roll coating, etc., without the need to employ an appreciable amount of volatile solvents.

Another unique feature of the present invention is that coating compositions may have a substantial degree of water solubility as well as organic solvent solubility, thus, aqueous or organic solvent based coating compositions may be formulated depending on the desired results. Aqueous based systems are particularly desirable because they negate the emission of photochemical, reactive or toxic solvent into the atmosphere.

Another advantage of the low molecular weight, low viscosity compositions is that they can be mixed with higher viscosity materials such as polyesters containing diacids or diols. Also high molecular weight modifiers such as polyesters, polyester polyols, polyacrylates, polyacrylate polyols, polyethers, polyether polyols, polyurethanes, polyurethane polyols, and the like may be blended or admixed with the compositions herein in order to provide desired properties.

Still another advantage of the compositions herein is that such compositions are usually a flowing liquid at room temperature even in the absence of a solvent. Thus, any unused portion of the composition in the form of over spray can easily be recovered by collecting the liquid composition by employing a gravity flow means which is connected to a collecting tank. Therefore, this not only increases the efficiency of usable compositions, but also helps to reduce environmental control problems.

Also because of the low viscosity of the compositions herein, they can be used as a reactive solvent for the polymerization of polyacrylates and the like. It will be noted that the ester-containing polyol can be mixed with amino resins and still be employed as a solvent for polyacrylate polymerization.

Other advantages include utility for spin disc and electrostatic application; low cost; provides for a highly crosslinked system; excellent salt spray resistance; good hardness; and detergent resistance.

The ester-containing polyol as employed herein can be substantially any simple polyester resin that is prepared from a polyol and a polycarboxylic acid by techniques that are well known in the esterification or alkyd resin art.

The polyester produced can be prepared from those polyols utilized in the preparation of conventional polyesters. Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, trimethylolethane, trimethylolpropane, tetramethylene glycol, 2,3-dihydroxybutane, 1,4-dihydroxybutane, 1,4-dihydroxy-2-ethyl butane, 1,6- dihydroxyhexane, 1,3-dihydroxyoctane, 2,10-dihydroxydecane, 2,2-diethylpropanediol-1,3, 2,2-diethylbutanediol-1,3, 4,5-dihydroxynonane, pentamethylene glycol, heptamethylene glycol, decamethylene glycol, butene-2-diol-1,4, 2,7-dihydroxy-n-hexane-4, 2-ethylhexanediol-1,3, glycerol, 1,2,6-hexanetriol, pentaerythritol, sorbitol, mannitol, methyl glycoside, 2,2-bis(hydroxyethoxyphenyl) propane, 2,2-bis(betahydroxypropoxyphenyl) propane, 2-hydroxyethylhydroxyacetate, 1,1-bi(hydroxymethyl)nitroethane, and the like. Mono-functional alcohols may also be employed to supplement the other polyols if desired. For example, more flexible polyesters are provided by employing a small amount of monofunctional alcohols to replace part of the more functional polyols. Useful alcohols include those having a carbon chain comprising from about 3 to about 18 carbon atoms. Those useful alcohols include primary, secondary, and tertiary alcohols, such as methanol, ethanol, propanol, isopropanol, 1-butanol, 2-butanol, tertbutanol, 1-pentanol, 3-pentanol, tert-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohols such as cyclohexanol and trimethylcyclohexanol.

Particularly useful polyols include diols and triols. Generally, the diol component includes glycols of the formula $HO(CH_2)_nOH$ wherein $n$ equals 2 to 10, glycols of the formulas $HO(CH_2CH_2O)_nH$ and $HO[CH(CH_3)CH_2O]_nH$ in which $n$ equals 1 to 10, such as ethylene glycol, diethylene glycol, and the like, 2,2-dimethyl-1,3-propanediol, 2,2-diethyl-1,3-propanediol, 2,2-diethyl-1,3-propanediol, 3-methyl-1,5-pentanediol, N-methyl and N-ethyl diethanolamines. Others include 4,4'-methylenebiscyclohexanol, 4,4'-isopropylidenebiscyclohexanol and various xylenediols, hydroxymethylphenylethyl alcohols, hydroxymethylphenylpropanols, phenylenediethanols, phenylenedipropanols and heterocyclic diols such as 1,4-piperazine diethanol and the like. Some of the preferred diols include 2-methyl-2-ethyl-1,3-propanediol, 2-ethyl-1,3-hexanediol and 2,2-dimethyl-3-hydroxypropyl, 2,2-dimethyl-3-hydroxypropionate and the like. The preferred triols (tri-functional polyols) are trimethylolpropane; trimethylolethane, 1,2,3-propanetriol; 1,2,4-butanetriol; 1,2,6-hexanetriol, and the like.

Illustrative of the various carboxylic acids that can be employed to react with the polyol include a variety of carboxylic acids such as acetic, butyric, formic, maleic, fumaric, itaconic, proponic, citraconic, isobutyric, trans-crotonic, mesaconic, acetylene dicarboxylic, aconitic, alpha-methyl itaconic, alpha, alpha dimethyl itaconic, oxalic, malonic, succinic, adipic, glutaric, sebacic, 2-methyl succinate, pimelic, 2,3-dimethyl succinic, suberic, hexyl succinic, azelaic, 3,3-diethyl glutaric, 3,3-dimethyl glutaric, 2,2-dimethyl glutaric, 2,2-dimethyl succinic, diglycolic acids and the like. Anhydrides of these acids, where they exist can be employed and are encompassed by the term "carboxylic acid." However, for purposes of this invention, the preferred acids are aliphatic non-alicyclic carboxylic acids.

The preferred aliphatic non-alicyclic carboxylic acids include succinic acid, glutaric acid, adipic acid, suberic acid, sebacic acid, azelaic acid, decona-dicarboxylic acid or 2,2,4- and 2,4,4-trimethyladipic acid. Particularly preferred saturated, aliphatic dicarboxylic acids are those containing 4 to 10 carbon atoms.

Hydroxy substituted carboxylic acids are also useful. Examples of these include glycolic, lactic, betahydroxybutyric, gluconic, tartronic, malic, tartaric, saccharic, citric, 9,10-dihydroxystearic, ricinoleic, dimethylolpropionic and the like.

Other ester-containing polyols which are useful include those comprising reaction products of aliphatic non-alicyclic carboxylic acids or a hydroxy-containing carboxylic acid and a polyol. It is recognized that such acids can be in the form of an anhydride or a lactone.

Examples of such ester-containing polyols include polycaprolactone polyols, which are reaction products of trimethylolpropane and epsiloncaprolactone in selected molar ratios. These ester-containing polyols are sold under the tradename Niax Polyol PCP-0200, 0301, 0310 and the like. It is preferred that the ester-containing polyol have from 1 to about 4 ester groups. However, ratios of one to one can readily be utilized when employing a reaction product of trimethylolpropane and propionic acid.

It is important to note that the acids employed herein provide for reaction products that have good aqueous and/or organic solvent solubility even at high solids, thus such reaction products are very suitable for formulating coatings which are easy to handle because of their solubility and low viscosity. Carboxylic acids having cyclic structures do not appear to give the same degree of solubility or as low viscosities as linear acids disclosed herein when employed in providing ester-containing polyols.

Generally, there are several well-known techniques in the art that may be used to prepare the ester-containing polyols that are employed herein; for example, the diacid and the polyol may be reacted together; the diacid may be reacted initially with a mono-alcohol and subsequently the reaction product is reacted with a polyol; the diacid may be initially reacted with a polyol and subsequently with an alkylene oxide such as propylene oxide or the like; or by reacting epsiloncaprolactone with a polyol as described above.

Also, ester-containing polyols prepared by means of the Tischenko reaction, for example, hydroxyethylisobutylaldehyde prepared in this manner may readily be employed to provide useful compositions according to this invention.

It is desirable that the ester-containing polyol have a high boiling point and a low vapor pressure so it does not evaporate on baking. Also, when a water-soluble composition is desired, the ester-containing polyol may have an acid value imparted thereto by incorporating sufficient acid therein. Also, the acid groups aid in enhancing the adhesion to the substrate. These acid groups can be neutralized with a base such as an amine to provide for the desired water solubility. The low viscosity of the compositions herein is provided by the linear structure of the ester-containing polyol and by selecting ester-containing polyols which are comprised of components which have low molecular weights.

In addition, the composition herein may be reduced with conventional organic solvents such as butyl acetate, butyl cellosolve, ethanol, butanol, methylethyl ketone, methylisobutyl ketone, cyclohexanone benzene, toluene, xylene or combinations thereof. Of course, the solvent selection will depend on the characteristics of the ester-containing polyol and the end result to be obtained. It is also possible to employ water to provide suitable aqueous compositions. Likewise, a combination of water and an organic liquid may be useful in many instances to reduce a particular composition.

The amine-aldehyde products employed herein are aldehyde condensation products of melamine, urea, benzoguanamine, or a similar compound. They may be water-soluble or they may be organic solvent-soluble. Generally, the aldehyde employed is formaldehyde, although useful products can be made from other aldehydes, such as acetaldehyde, crotonaldehyde, acrolein, benzaldehyde, furfural, and others. Condensation products of melamine, urea and benzoguanamine are the most common and are preferred, but products of other amines and amides in which at least one amino group is present can also be employed.

For example, such condensation products can be produced from triazines, diazines, triazoles, guanidines, guanamines, and alkyl and aryl-substituted derivatives of such compounds, including alkyl-substituted, aryl-substituted and cyclic ureas, and alkyl and aryl-substituted melamines. Some examples of such compounds are N,N-dimethyl urea, benzyl urea, N,N'-ethylene urea, diazine diamide formaguanamine, acetoguanamine, ammeline, 2-chloro-4,6-diamino, 1,3,5-triazine, 3,5-diaminotriazole, 4,6-diamino-propyrimidine, 2,4,6-triphenyltriamino-1,3,5-triazine, and the like.

These aldehyde condensation products contain methylol groups or similar alkylol groups, depending upon the particular aldehyde employed. Ordinarily, in producing amine-aldehyde condensation products, all or part of these methylol groups are etherified by reaction with an alcohol to produce an alkylated product. In the present invention, there are employed those condensation products which are substantially completely alkylated. By this it is meant that all or substantially all of the methylol groups have been etherified; generally speaking, those products containing not more than an average of about one unalkylated alkylol group per molecule are utilized. However, if improved water compatibility is desired then it is best to utilize lower alkylated amino resins.

Various alcohols can be employed for the etherification of the alkylol groups. These include essentially any monohydric alcohol, with the preferred alcohols being methanol, ethanol, propanol, butanol, and other lower alkanols having up to about 5 carbon atoms, including isomers such as 2-methyl-1-propanol. There can also be employed alcohols such as the lower alkyl monoethers of ethylene glycol and the like; for instance, ethyl Cellosolve and butyl Cellosolve. Higher alcohols can be used but are less desirable because they tend to affect the film properties of the baked film. When the alkylated amine-aldehyde condensate is to be utilized in a vehicle to be employed in a water-dispersed coating composition, it is preferred to employ a water-soluble alcohol in the etherification.

The amine-aldehyde condensation products are produced in a manner well known in the art, using acidic or basic catalysts and varying conditions of time and temperature. The aldehyde is often employed as a solution in water or alcohol, and the condensation, polymerization and etherification reactions may be carried out either sequentially or simultaneously.

Specific useful amine-aldehydes include methylated, ethylated tetramethylolbenzoguanamine-formaldehyde, hexakis(methoxymethyl) melamine, hexamethoxymethylmelamine, ethoxymethoxymethyl-melamine, trimethoxymethylmelamine, triethoxymethylmelamine and the like. It will be noted that more than one crosslinking agent may be employed.

In addition to the amine-aldehyde crosslinking agent, a variety of other modifiers and co-curing components may be utilized. For example, polyester resins which have high viscosities such as those prepared from cyclic dicarboxylic acid and diols may be added. Likewise, other polyols which have no ester groups; for example, trimethylolpropane or trimethylolpropane monoallyl ether may be employed.

Also, high molecular weight modifiers which may or may not contain reactive groups such as polyester resins, acrylates, polyacrylates, polyvinyl butyral, polyvinyl chloride, polyurethanes, cellulose acetate butyrates and the like may be blended or admixed with the compositions herein in order to provide desired properties. Also, the low molecular weight compositions herein may be used to modify other resin systems. The amount of the modifiers employed will vary depending upon the characteristics desired to be imparted to the final composition.

The compositions described herein may be employed in the presence of a catalyst although these compositions may in some instances cure at room temperature even in the absence of a catalyst. When a catalyst is employed, it is usually present in an amount from 0 to about 5 percent by weight based on the total solids content of the ester-containing polyol and crosslinking agent. Typical catalysts that may be employed include para-toluenesulphonic acid, alkyl phosphoric acid, hydrochloric acid, methanesulphonic acid and the like.

The amount of ester-containing polyol is from about 30 to about 85 percent by weight of ester-containing polyol and amine-aldehyde crosslinking agent and the amine-aldehyde crosslinking agent is present in an amount from about 15 to about 70 percent by weight of total coating composition; however, it is understood that such percentages may be varied to a degree in order to provide utility for a particular purpose. As previously mentioned herein, it is necessary that the ester containing polyol herein have a molecular weight of less than about 850 and have a viscosity of less than about 60 poises at room temperature. Also, it is preferable that the ester-containing polyol contain from 1 to about 4 ester groups.

The compositions herein may be pigmented by techniques well known in the art. Some of the prime opacifying pigments that may be incorporated within the films provided include titanium pigments, lead pigments, zinc pigments, antimony pigments, cadmium pigments, molybdenum pigments and iron pigments. Specific opacifying pigments which may be employed include anatase titanium dioxide, rutile titanium dioxide, basic carbonate white lead, basic sulfate white lead, basic silicate white lead, zinc oxide, leaded zinc oxide, zinc sulfide, lithopone, titinated lithopone and antimony oxide.

Extender pigments, well known in the art may also be employed. Examples of such pigments include whiting ($CaCO_3$), gypsum ($CaSO_4$), magnesium silicate ($3MgO \cdot SiO_2 \cdot H_2O$), magnesium carbonate ($MgCO_3$), china clays ($Al_2O_3 \cdot 2SiO_2 \cdot 2H_2O$), mica ($K_2O \cdot 3Al_2O_3 \cdot 6SiO_2 \cdot 2H_2O$), silica ($SiO_2$), diatomaceous silica, barium sulfate ($BaSO_4$), barium carbonate ($BaCO_3$), and aluminumhydrate ($Al[OH]_3$). It is understood that many other known extenders may be employed in accordance with the practice of this invention and the pigments indicated above are merely exemplary of the many which are known in the art.

It is also possible to incorporate various known colored pigments into the films of this invention. Some red pigments which may be used in accordance with the practice of this invention are Indian red ($Fe_2O_3$), tuscan red, venetian red, red lead ($Pb_3O_4$), orange mineral, English vermillion (HgS), American vermillion (chrome red, scarlet lead chromate which is a basic chromate of lead), and lakes which are formed by combination of the coloring matter of certain dyes with inorganic carriers, such as $BaSO_4$, $CaSO_3$, or clay. Among the most important lakes are the vermillions and scarlets made from para red, and from alizarin. Examples of blue pigments which may be incorporated in the films of this invention are phthalo-cyanine blue, Prussian blue ($Fe[Fe(CN)_6]_3$) being the approximate empirical formula, ultramarine, cobalt blue, sublimed blue lead consisting mainly of $PbSO_4$ and PbO with a minor amount of PbS, $PbSO_3$ and ZnO. Some of the preferred green pigments are phthalocyanine green, chrome green and chrome oxide green. It is also possible to incorporate some of the well known yellow pigments such as chrome yellows, yellow ochers and raw siennas. It is also contemplated by employing the practice of this invention to incorporate brown pigments such as burnt sienna, raw umber, burnt umber and Vandyke brown, otherwise known as Cassel earth or Cologne earth which is a natural pigment of a carbonaceous nature and is distinguished by its solubility in dilute alkali.

It will be understood by those of skill in the art that many other pigments may be incorporated into films of this invention. The pigments indicated hereinabove are some of the more important pigments which may be used.

Optical brighteners, fluorescent materials and mixtures thereof may also be incorporated within the films of this invention to effect their known characteristics upon the films. Optical brighteners are well known in the art and are generally defined herein as those materials which absorb appreciable light energy in the ultraviolet region of light and emit energy within the visible region of light. Thus, such materials serve to brighten the vehicles which carry them. Fluorescent materials are likewise well known in the art and are generally defined herein as those materials which absorb light energy in the ultraviolet and portions of the visible region of light and emit light energy of a given wave length (i.e., color) in the visible region of light. Thus, such materials brightly color the vehicles which carry them.

The compositions herein may be easily applied by the techniques previously mentioned; for example, spraying, dipping, roll coating, and the like.

The substrate can be any of the standard metals employed in the art such as iron, zinc, steel, copper, brass, aluminum, and the like. Other substrates may include glass, asbestos, concrete, stone, plastic, and in some instances paper and wood.

The baking schedule employed herein can vary depending on the amount of crosslinking agent utilized, the resins employed, the amount and type of acid catalyst used; but generally schedules of from about 170° F. for 30 minutes to about 500° F. for 90 seconds are sufficient.

In order that those skilled in the art may more completely understand the present invention and the preferred methods by which the same may be carried out, the following specific examples are offered:

EXAMPLE I

This is an example of a high solids coating containing two crosslinking agents.

|  | Parts by Weight |
|---|---|
| Neopentyl glycol adipate* | 60 |
| Benzoguanamine resin (60 percent solids aldehyde condensation product) | 20 |
| Hexamethoxymethyl melamine | 20 |
| p-Toluenesulfonic acid - (2 percent based on resin solids of a 20 percent solution in isopropyl alcohol) | 1.8 |

*Derived from reacting 1.8 moles of neopentyl glycol and 1.0 mole of adipic acid.

This example had a pigment to binder ratio of 0.95 to 1.0. The pigment employed was titanium dioxide.

This composition was applied at 90 percent solids cut in a solvent mixture of butanol and xylene. A coating of the composition was applied to a steel panel. The composition was heated to about 110°–120° F. and spray applied by means of an electrostatic spray disc and subsequently baked for 20 minutes at 350° F.

The films provided had good flexibility, hardness, detergent resistance and stain resistance.

EXAMPLE II

A useful coating composition was formulated from the following components:

|  | Parts by Weight |
|---|---|
| Acrylic Resin A (below) | 48 |
| Neopentyl glycol adipate(molecular weight-320)* | 50 |
| Hexamethoxymethyl melamine (solids content 100%, molecular weight 390, viscosity - waxy solid) | 32 |
| p-Toluenesulfonic acid (catalyst) | 2 |

*2.2 moles of neopentyl glycol and 1.0 mole of adipic acid.

This composition had a viscosity of 23 poises and a percentage solid content of about 82 percent.

Acrylic Resin A was a 50 percent solids polymer comprised of:

| 10 percent acrylamide |
| 2.5 percent methacrylic acid |
| 42.5 percent butyl acrylate |
| 20.0 percent methacrylonitrile |
| 25.0 percent styrene | which was cut in a solvent mixture comprising 25 percent butanol, 50 percent Solvesso 150 (high boiling aromatic hydrocarbon solvent - b.p. range 185°–200° C.) and 25 percent xylene.

EXAMPLE III

This is an example of a high solids coating composition comprising:

|  | Parts by Weight |
|---|---|
| Acrylic Resin B (below) | 51 |

-continued

| | Parts by Weight |
|---|---|
| Ester diol 204 (2,2-dimethyl-3-hydroxypropyl-2,2-dimethyl-3-hydroxypropionate) | 50 |
| Hexamethoxymethyl melamine | 32 |
| p-Toluenesulfonic acid (catalyst solution) | 2 |

This composition had a viscosity of 6 poises and a solids content of about 81 percent.

Acrylic Resin B was 50 percent solids and comprised of the following components:

| |
|---|
| 10 percent hydroxyethyl acrylate |
| 2.5 percent methacrylic acid |
| 30.0 percent styrene |
| 20.0 percent ethylhexyl acrylate |
| 19.5 percent butyl methacrylate |
| 18.0 percent methyl methacrylate | and was cut in a solvent mixture comprising 90 percent xylene and 10 percent butanol.

EXAMPLE IV

A useful coating was formulated from the following components:

| | Parts by Weight |
|---|---|
| Reaction product (a polyol-containing ester and urethane groups)* | 46.5 |
| Neopentyl glycol adipate (molecular weight 320) | 50.0 |
| Hexamethoxymethyl melamine | 32.0 |
| p-Toluenesulfonic acid (catalyst solution) | 2.0 |

*This reaction product was 54.18 percent solids and contains 90.42 percent of an ester-containing polyol (below) and 9.58 percent diisocyanate (Hylene W).

The ester-containing polyol was 66 percent solids thinned in methylisobutyl ketone and was comprised of 35.33 percent neopentyl glycol adipate, 56.57 percent neopentyl glycol isophthalate, 1.23 percent trimethylolpropane isophthalate, and 6.87 percent trimethylolpropane.

This coating composition had a viscosity of 17 poises and a solids content of about 84 percent.

Examples V – VIII are high solids coating compositions containing polyvinyl butyral, polyvinyl chloride and cellulose acetate butyrate, respectively, as modifying agents.

EXAMPLE V

A useful coating composition may be formulated by employing polyvinyl butyral in the following manner:

| | Parts by Weight |
|---|---|
| Polyvinyl butyral solution (13.5% in methanol) | 18.5 |
| Neopentyl glycol adipate (molecular weight-320) | 50.0 |
| Hexamethoxymethyl melamine | 32.0 |
| p-Toluenesulfonic acid (catalyst solution) | 2.0 |

This composition would have a solids content of about 84 percent.

EXAMPLE VI

A useful composition was formulated by employing polyvinyl chloride in the following manner

| | Parts by Weight |
|---|---|
| Polyvinyl chloride solution* | 11.0 |
| Neopentyl glycol adipate (molecular weight-320) | 50.0 |
| Hexamethoxymethyl melamine | 32.0 |
| p-Toluenesulfonic acid (catalyst solution) | 2.0 |

*23 percent solids in a solvent mixture of methylethyl ketone and toluene.

EXAMPLE VII

A useful composition containing cellulose acetate butyrate was prepared as follows:

| | Parts by Weight |
|---|---|
| Cellulose acetate butyrate* | 62.5 |
| Neopentyl glycol adipate (molecular weight-320) | 50.0 |
| Hexamethoxymethyl melamine | 32.0 |
| p-Toluenesulfonic acid (catalyst solution) | 2.0 |

*40 percent solids content in a mixture of methylethyl ketone and toluene.

This composition had a viscosity of 3.2 poises and a solids content of 74.3 percent.

EXAMPLE VIII

A useful coating composition was formulated by employing a polyester additive alone with an ester-containing polyol.

| | Parts by Weight |
|---|---|
| Polyester additive | 43 |
| Neopentyl glycol adipate (molecular weight-320) | 50 |
| Hexamethoxymethyl melamine | 32 |
| p-Toluenesulfonic acid (catalyst solution) | 2 |

The polyester additive had 66.0 percent solids content cut in methylisobutyl ketone and comprised the following components:

| | Parts by Weight |
|---|---|
| Neopentyl glycol | 129.9 |
| Trimethylolpropane | 22.1 |
| Adipic acid | 72.3 |
| Isophthalic acid | 123.2 |
| Methylisobutyl ketone | 150.0 |

This composition had a viscosity of 6.3 poises and a solids content of about 88 percent.

Coating compositions of Examples I – VIII were made by drawing down a 3 mil thick wet film on steel panels and thereafter baking at 250° F. for ½ hours. The coatings so provided were tough and had a pleasing appearance.

EXAMPLE IX

In this example, a comparison was made between an ester-containing polyol prepared from hexahydroterephthalic acid and adipic acid having about the same molecular weight (590).

Composition A — (control) was comprised of hexahydroterephthalic acid propylene glycol and had a hydroxyl value of 190.

Composition B — was comprised of adipic acid and propylene glycol and had a hydroxyl value of 188. The solubility and viscosity parameters are set forth in Table I below.

Composition F — Comprising Niax Polyol PCP-0301 (a reaction product of epsilon-caprolactone and trimethylolpropane) and having a hydroxyl value of 560 and a molecular weight of 300.

The table below tabulates the respective solubilities and viscosities.

TABLE II

| | Compositions | | | | | |
|---|---|---|---|---|---|---|
| | A | B | C | D | E | F |
| Water Solubility and Viscosity | 13 parts water in 100 parts Composition A- 6 poises | 18 parts water in 100 parts Composition B- 0.90–0.95 poises | 18 parts water in 100 parts Composition C- 1.52 poises | 53 parts water in 100 parts Composition D- 0.5 poises | 53 parts water in 100 parts Composition E- < 0.5 poises | 53 parts water in 100 parts Composition F- < 0.5 poises |
| 20 % Ethanol in Water Solubility and Viscosity | 18 parts solution in 100 parts Composition A - 3.3 poises | 20 parts solution in 100 parts Composition B - 0.65 poises | 38 parts solution in 100 parts Composition C - 0.90–0.95 poises | > 100 parts solution in 100 parts Composition D - < 0.5 poises | > 100 parts solution in 100 parts Composition E - < 0.5 poises | > 100 parts solution in 100 parts Composition F - < 0.5 poises |
| Solubility and Viscosity in Ethanol | 20 parts ethanol in 80 parts Composition A- 0.90–0.95 poises | 20 parts ethanol in 80 parts Composition B- < 0.5 poises | 20 parts ethanol in 80 parts Composition C- 0.5 poises | 20 parts ethanol in 80 parts Composition D- < 3.4 poises | 20 parts ethanol in 80 parts Composition E- 0.5 poises | 20 parts ethanol in 80 parts Composition F- 1.25 poises |
| Viscosity in the absence of Solvent | 61 poises | 3.4 poises | 20 poises | 3.2 poises | 3.4 poises (solidifies at room temperature on standing) | 17.6 poises |

TABLE I

| | Composition A (Control) | Composition B (Example IX) |
|---|---|---|
| Water Solubility | 8 parts water in 100 parts Composition A - 80 poises | 18 parts water in 100 parts Composition B - 1.3 poises |
| 20% Ethanol in Water Solubility | 8 parts solution in 100 parts Composition A - 200 poises | 23 parts solution in 100 parts Composition B - 9 poises |
| Solubility in Ethanol | 20 parts ethanol in 80 parts Composition A - 1.9 poises | 20 parts ethanol in 80 parts Composition B - 0.4 poises |
| Viscosity in the absence of solvent | 450 poises | 5 poises |

It can be observed from the data in Table I that Composition B has superior solubility in both aqueous media and organic media when compared to that of Composition A even though the molecular weights are about the same. It is also significant to note that the viscosity of Composition B is substantially lower than that of Composition A.

The high viscosity of Composition A is believed to be due to the cyclic structure of the acid.

EXAMPLE X

The following ester-containing polyols were evaluated for solubility and viscosity.

Composition A — Comprising hexahydroterephthalic acid and propylene glycol and having a hydroxyl value of 234 and a molecular weight of 480.

Composition B — Comprising adipic acid and propylene glycol and having a hydroxyl value of 281 and a molecular weight of 400.

Composition C — Comprising adipic acid and neopentyl glycol and having a hydroxyl value of 220 and a molecular weight of 500.

Composition D — Comprising ethylene adipate and having a hydroxyl value of 224 and a molecular weight of 458.

Composition E — Comprising Ester Diol 204 (2,2-dimethyl-3-hydropropyl-2,2-dimethyl-3-hydroxypropionate) and having a hydroxyl value of 545 and a molecular weight of 204.

Again, it will be noted that Composition A which contains the cyclic acid (hexahydroterephthalic acid) is generally less soluble and usually has a higher viscosity.

Compositions B, C. D, E and F are suitable for formulating coating compositions which have the desired molecular weight, solubility and viscosity.

EXAMPLE XI

In this example, Compositions A and B were compared for hardness and impact resistance.

Composition A — Was an ester-containing polyol having a molecular weight of 580 and a viscosity of 150 poises. The ester-containing polyol was derived from hexahydroterephthalic acid and propylene glycol. Composition A was then blended with 50 percent by weight hexakis (methoxymethyl) melamine.

Composition B — Was an ester-containing polyol having a viscosity of 11.5 poises and derived from adipic acid and neopentyl glycol. Composition B was blended with 50 percent by weight hexakis (methoxymethyl) melamine.

Both compositions were applied to steel panels and baked to a uniform film thickness. The hardness of both compositions was the same (Sward-38-40), however, Composition B had an impact resistance of about 160 inch pounds (Gardner) compared to only 90 inch pounds for Composition A. This result was exemplary of the difference obtained with and without a cyclic acid.

EXAMPLES XII – XXXVII

Listed below are examples of the various molar ratios of the various acids and polyols that may be employed to provide the ester-containing polyol of the present invention.

ester-containing polyol may vary so long as the molecular weight of the polyol is less than about 850 and the viscosity is less than 60 poises. Other acids that may be employed include malonic, fumaric, mesaconic, oxalic, glutaric and the like. Other polyols include trimethylolpropane, butylene glycol, glycerol, 1,2,6-hexanetriol pentaerythritol and the like. In addition, other amine-aldehyde crosslinking agents may be employed such as

| Example | Components | Acid to Polyol (molar ratio) | Viscosity Poises | Hydroxyl Value | Molecular Weight |
|---|---|---|---|---|---|
| XII | adipic acid | 2 | | | |
| | propylene glycol | 1 | 5.2 | 188 | 590 |
| XIII | adipic acid | 2 | | | |
| | propylene glycol | 1 | 3.4 | 281 | 392 |
| XIV | Ester Diol 204 | — | 3.4 | 545 | 204 |
| XV | PL-500-Witco's (diethylene glycol, epsilon-caprolactone) | — | 9.5 | 224 | 500 |
| XVI | Niax Polyol 0300 (trimethylol-propane-caprolactone) | — | 12.9 | 310 | 540 |
| XVII | Niax Polyol 0301 (trimethylol-propane caprolactone) | — | 17.6 | 560 | 300 |
| XVIII | Niax Polyol 0310 (trimethylol-propane-caprolactone) | — | 12.9 | 200 | 840 |
| XIX | Trimethylolpropane monoallyl ether | 3 | | | |
| | adipic acid | 2 | 17.6 | 137 | 830 |
| XX | diethylene glycol | 3 | | | |
| | adipic acid | 2 | 10.7 | 181 | 622 |
| XXI | diethylene glycol | 4 | | | |
| | adipic acid | 3 | 10.7 | 131 | 805 |
| XXII | adipic acid | 2.2 | | | |
| | Ester Diol 204 | 1 | 22.7 | 220 | 500 |
| XXIII | adipic acid | 1 | | | |
| | Ester Diol 204 | 2 | 27 | 186 | 600 |
| XXIV | neopentyl glycol | 1.8 | | | |
| | adipic acid | 1 | 17 | 257 | 438 |
| XXV | neopentyl glycol | 1.5 | | | |
| | adipic acid | 1 | 36.2 | 173 | 650 |
| XXVI | neopentyl glycol | 2.1 | | | |
| | adipic acid | 1 | 12.9 | 342 | 328 |
| XXVII | neopentyl glycol | 2 | | | |
| | azelaic acid | 1 | 12.9 | 220 | 510 |
| XXVIII | neopentyl glycol | 2.2 | | | |
| | sebacic acid | 1 | 10.7 | 321 | 350 |
| XXIX | 1,6-hexanediol | 2.2 | | | |
| | adipic acid | 1 | 2.8 | 350 | 320 |
| XXX | trimethylolpropane | 1 | — | — | |
| | propionic acid | 1 | | | 190 |
| XXXI | ethylene glycol | 2.2 | | | |
| | adipic acid | 1 | 1.4 | 497 | 226 |
| XXXII | neopentyl glycol | 2 | | | |
| | sebacic acid | 1 | 10.7 | 339 | 330 |
| XXXIII | neopentyl glycol | 2.1 | | | |
| | sebacic acid | 1 | 8.8 | 305 | 368 |
| XXXIV | dodecenyl succinic anhydride | 1 | | | |
| | ethylene glycol | 2 | 46.3 | 293 | 383 |
| XXXV | dodecenyl succinic anhydride | 1 | | | |
| | neopentyl glycol | 2.1 | 47.0 | 382 | 293 |
| XXXVI | maleic anhydride | 1 | | | |
| | diethylene glycol | 2 | 36.2 | 280 | 400 |
| XXXVII | maleic anhydride | 1 | | | |
| | ethylene glycol | 2.3 | 13.0 | 504 | 222 |

The components disclosed above may be reacted under conditions well known in the art. The resulting ester-containing diols may readily be admixed with a suitable amount of an amine-aldehyde crosslinking agent and cured to provide for coatings that have good adhesion, flexibility and hardness.

In addition to the parameters and components disclosed in the above examples, other conditions may be used and likewise, other components may be utilized or substituted for those employed hereinabove. In many instances the solids content may be 100 percent provided the viscosity is such that the coating composition can readily be applied. Also, the components of the N,N-dimethyl urea, benzyl urea, N,N'-ethylene urea, formaguanamine, 1,3,5-triazine, ethoxymethoxymethyl melamine, methylated, ethylated tetramethylolbenzoguanamine-formaldehyde.

As previously pointed out, a wide variety of pigments can be employed to enhance the appearance or protective qualities of the coatings herein. These pigments include basic carbonate white lead, zinc oxide, zinc sulfide, antimony oxide, gypsum magnesium silicate, china clays, barium sulfate, red lead, venetian red, chrome red, Prussian blue, cobalt blue and the like.

While there are above-described a number of specific embodiments of the present invention, it is obviously possible to produce other embodiments and various equivalent modifications thereof without departing from the spirit of the invention.

Having set forth the general nature and specific embodiments of the present invention, the scope thereof is now particularly pointed out in the appended claims.

I claim as my invention:

1. A coating composition having a solids content of at least 70 percent by weight based on weight of said coating composition comprising:
   a. from about 30 to about 85 percent based on weight of (a) and (b) of an ester-containing polyol having a molecular weight of less than about 850 and a viscosity of less than about 60 poises; wherein said ester-containing polyol is comprised of an aliphatic non-alicyclic carboxylic acid and a polyol wherein said acid may be in the form of anhydride or a lactone
   b. from about 15 to about 70 percent based on weight of (a) and (b) of an amine-aldehyde crosslinking agent.

2. A composition as in claim 1 wherein the solids content is at least about 85 percent.

3. A composition as in claim 1 having as an additional component therein, a pigment.

4. A composition as in claim 1 comprising up to about 30 percent by weight based on total weight of said coating composition of a liquid selected from the group consisting of water, organic solvent or combinations thereof.

5. A composition as in claim 1 wherein the ester-containing polyol is a reaction product of polycarboxylic acid and a polyol.

6. A composition as in claim 5 wherein the polycarboxylic acid is an aliphatic non-alicyclic dicarboxylic acid.

7. A composition as in claim 6 wherein the acid is selected from the class consisting of adipic, azelaic, sebacic, maleic, fumaric, succinic and glutaric acid.

8. A composition as in claim 6 wherein the acid contains from 4 to 10 carbon atoms.

9. The composition of claim 5 wherein the polyol is a diol or triol.

10. A composition as in claim 5 wherein the polyol is selected from a class consisting of ethylene glycol, neopentyl glycol, diethylene glycol, trimethylolpropane monoallyl ether, and 1,6-hexanediol.

11. A composition as in claim 1 wherein the ester-containing polyol has from 1 to about 4 ester groups.

12. A composition as in claim 1 wherein the ester-containing polyol is a reaction product of trimethylolpropane and epsilon caprolactone.

13. A composition as in claim 1 wherein the ester-containing polyol is a reaction product of diethylene glycol and epsilon caprolactone.

14. A composition as in claim 1 wherein the crosslinking agent is a member of the class consisting of aldehyde condensation products of melamine, urea, and benzoguanamine.

15. A composition as in claim 1 having as an additional component a catalyst present in an amount up to about 5 percent by weight based on the total solids content of the ester-containing polyol and crosslinking agent.

16. A coating composition having a solids content of at least 70 percent by weight based on weight of said coating composition comprising:
   a. from about 30 to about 85 percent based on weight of (a) and (b) of neopentyl glycol adipate; and
   b. from about 15 to about 70 percent based on weight of (a) and (b) of a mixture of benzoguanamine resin and condensation product of an aldehyde and a melamine resin.

17. A method of coating a substrate with a coating composition having a solids content of at least 70 percent by weight based on weight of said coating composition which comprises the steps of:
   a. admixing
      1. from about 30 to about 85 percent based on weight of (1) and (2) of an ester-containing polyol having a molecular weight of less than about 850 and a viscosity of less than about 60 poises; wherein said ester-containing polyol is comprised of an aliphatic non-alicyclic carboxylic acid and a polyol wherein said acid may be in the form of an anhydride or a lactone, with
      2. from about 15 to about 70 percent based on weight of (1) and (2) of an amine-aldehyde crosslinking agent, with
      3. from 0 to about 5 percent by weight based on the total solids content of (1) and (2) of a catalyst.
   b. applying said composition to said substrate; and
   c. curing said coating.

18. The method of claim 17 wherein the solids content is at least about 85 percent.

19. The method of claim 17 having as an additional component therein, a pigment.

20. The method of claim 17 comprising up to about 30 percent by weight based on total weight of said coating composites of a liquid selected from the group consisting of water, organic solvent or combinations thereof.

21. The method of claim 17 wherein the ester-containing polyol is a reaction product of polycarboxylic acid and polyol.

22. The method of claim 21 wherein the polycarboxylic acid is an aliphatic non-alicyclic dicarboxylic acid.

23. The method of claim 22 wherein the acid is selected from the class consisting of adipic, azelaic, sebacic, maleic, fumaric, succinic and glutaric acid.

24. The method of claim 22 wherein the acid contains from 4 to 10 carbon atoms.

25. The method of claim 21 wherein the polyol is a diol or triol.

26. The method of claim 21 wherein the polyol is selected from a class consisting of ethylene glycol, neopentyl glycol, diethylene glycol, trimethylolpropane monoallyl ether, and 1,6-hexanediol.

27. The method of claim 17 wherein the ester-containing polyol has from 1 to about 4 ester groups.

28. The method of claim 17 wherein the ester-containing polyol is a reaction product of trimethylolpropane and epsilon caprolactone.

29. The method of claim 17 wherein the ester-containing polyol is a reaction product of diethylene glycol and epsilon caprolactone.

30. The method of claim 17 wherein the crosslinking agent is a member of the class consisting of aldehyde condensation products of melamine, urea, and benzoguanamine.

31. The method of claim 17 wherein the ester-containing polyol is a reaction product of a monocarboxylic acid and a polyol.

32. The method of claim 31 wherein acid is selected from the class consisting of acetic, butyric, formic, proponic, isobutyric, and transcrotonic.

33. The method of claim 31 wherein the polyol is a diol or triol.

34. An article of manufacture comprising a substrate having thereon a cured coating composition, said composition being formed by curing the composition of claim 1.

* * * * *